Figure 1:
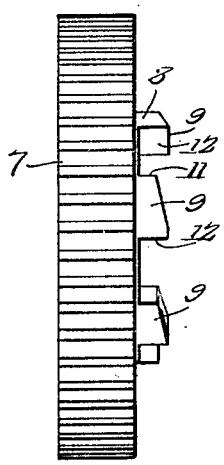

C. L. ANDERSON AND C. E. SWENSON.
METHOD OF AND APPARATUS FOR HOBBING TEETH ON REVOLVING BLANKS.
APPLICATION FILED NOV. 11, 1918.

1,380,286.

Patented May 31, 1921.

Inventor:
Carl L. Anderson
Carl E. Swenson
By Ira J. Wilson
Atty.

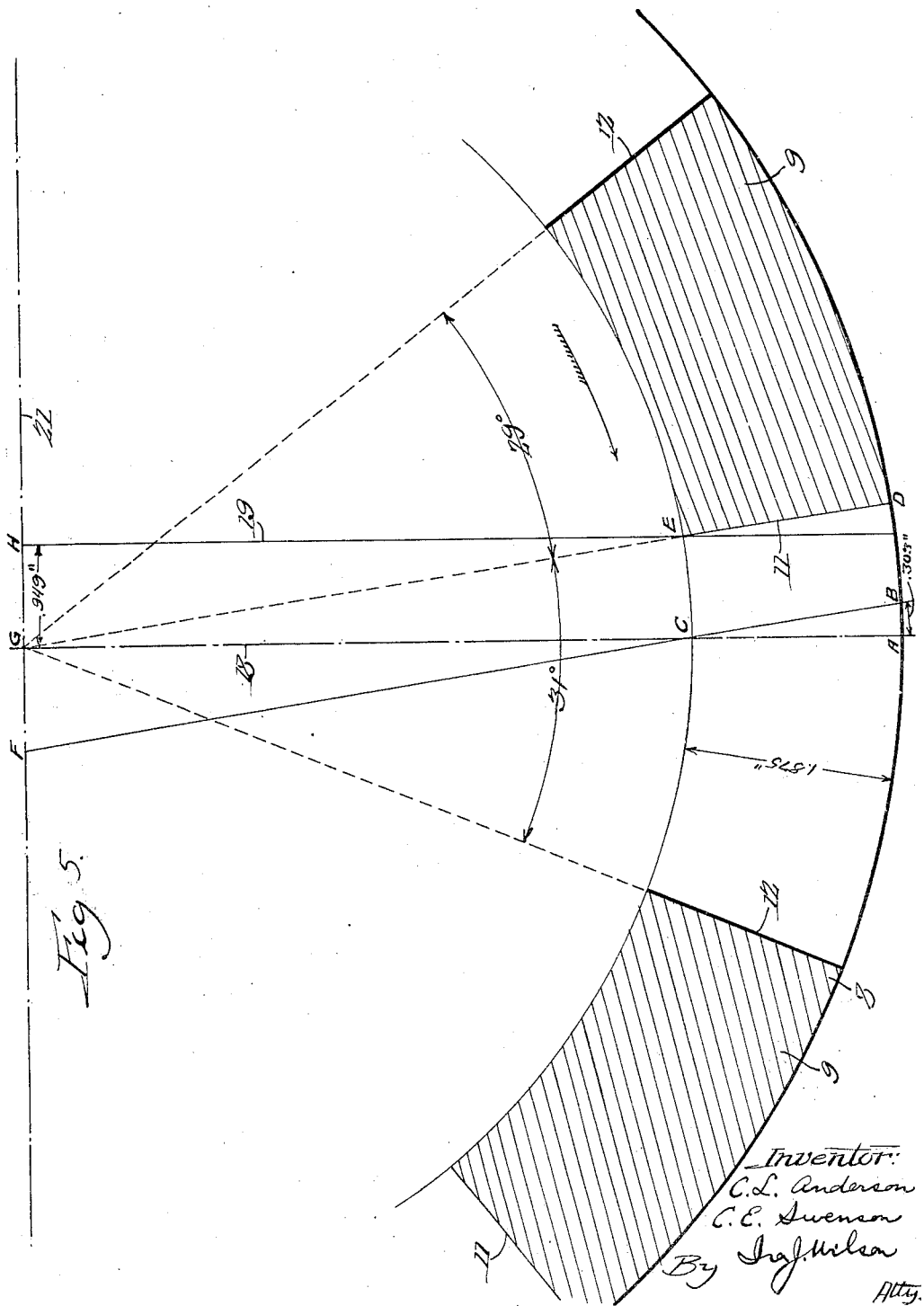

UNITED STATES PATENT OFFICE.

CARL L. ANDERSON AND CARL E. SWENSON, OF ROCKFORD, ILLINOIS.

METHOD OF AND APPARATUS FOR HOBBING TEETH ON REVOLVING BLANKS.

1,380,286.  Specification of Letters Patent.  Patented May 31, 1921.

Application filed November 11, 1918. Serial No. 261,947.

*To all whom it may concern:*

Be it known that we, CARL L. ANDERSON and CARL E. SWENSON, citizens of the United States, residing at Rockford, in the county of Winnebago and State of Illinois, have invented certain new and useful Improvements in Methods of and Apparatus for Hobbing Teeth on Revolving Blanks, of which the following is a specification.

This invention relates in general to the cutting of teeth on a revolving blank by means of a hobbing operation as distinguished from a milling operation in which the blank must be indexed and either a revolving or reciprocating milling cutter is used, and has more particular reference to the cutting or hobbing of various forms of teeth on revolving blanks, such for example as those on "dental tooth" clutches, commonly used in gear transmissions for motor vehicles and as a clutch element in various types of machinery. In addition to hobbing a dental tooth clutch, our invention also contemplates the hobbing of radial and curved or deviating surfaces for various other purposes as will be manifest from the following description.

In the present illustration of our invention, we will describe, simply as one example, the method of hobbing a dental tooth clutch. A clutch element of this kind comprises a plurality of circumferentially spaced teeth whose engaging surfaces are in planes radial to the axis about which the clutch element revolves. These clutches are now manufactured in quite large quantities, especially for the motor-vehicle industry. The practice has been to separately cut each engaging surface of the teeth by a milling operation, the blank being indexed for each surface. In order to produce dental tooth clutches by this method to the high degree of accuracy required, constant skilled attention must be exercised and considerable time is involved by reason of the slow cutting operations and the frequent indexing; all of which make the cost of production comparatively large in proportion to the work accomplished.

The primary object of the present invention is to provide a method of and means for hobbing dental tooth clutch surfaces or any radial curved or deviating teeth or surfaces more quickly and accurately and at considerably less cost than has been possible to produce similar work under the methods heretofore employed. Hobbing a dental tooth clutch or similar work of the character in mind, that is, in which both the blank and the cutter revolve, presents an essentially different problem from the ordinary method of cutting or hobbing gears, etc., mainly in that under the present method the surfaces to be hobbed are at one side of the blank instead of being on the periphery as in the ordinary case of hobbing.

The problem presented herein, that is, of cutting a dental tooth clutch by means of a hobbing method, we have solved by mathematical computations taking into consideration the conditions present, the relation of the revolving blank and cutter, and the object to be accomplished. In the following description, one example is given of the method by which a hobbing cutter is mounted relatively to the blank for producing a dental tooth clutch in which the engaging surfaces of the teeth are radial.

Referring to the drawings,—

Figure 2:
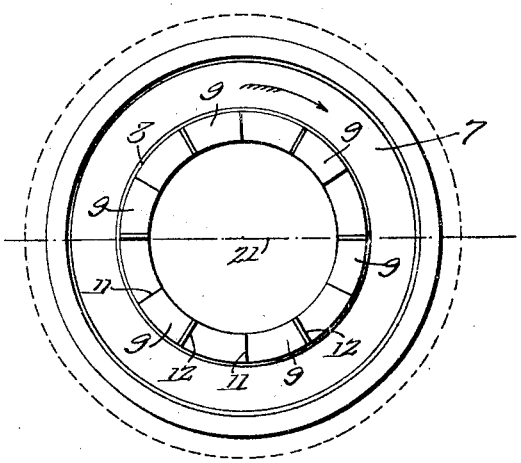
Figure 3:
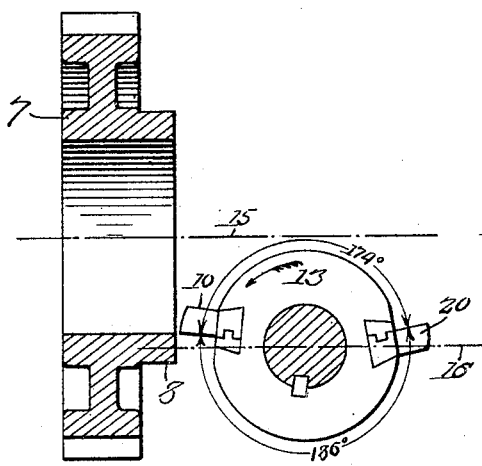
Figure 4:
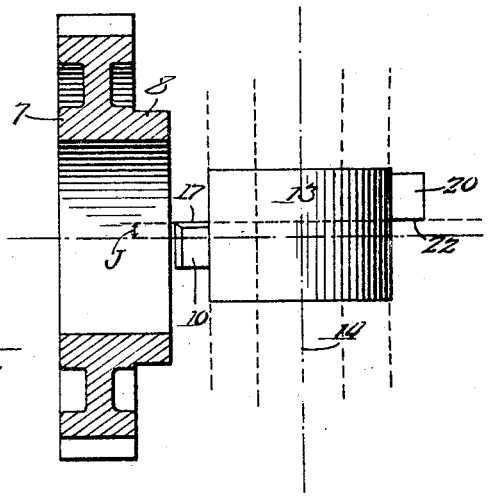

Figure 1 is an edge view of a blank in the form of a spur gear having a dental tooth clutch on one side;

Fig. 2, a face view of the clutch side of the gear;

Fig. 3, a vertical section of a blank showing the relation of the hobbing cutter thereto;

Fig. 4, a horizontal sectional view through the blank showing the hobbing cutter in a plan view; and Fig. 5, a diagrammatic view illustrating the method of calculation by which the relative position of the hobbing cutter and blank is arrived at.

It is believed that our novel method of hobbing will be most readily understood by referring to one of the most simple applications of the method. It may be assumed that the problem is to cut a dental tooth clutch element such as shown in Figs. 1 and 2, consisting of a blank or body 7, which in the present case may be in the form of a spur gear having an annular body 8, cut away at circumferentially spaced intervals to provide a plurality of teeth 9. There are six of these teeth on this particular clutch element and the engaging surfaces 11 and 12 are each in radial planes. Each tooth is beveled on its end; but whether or not this bevel is effected simultaneously with cutting of the surfaces 11 and 12 has no bearing on the present invention.

We propose to cut these teeth by a hobbing operation in such manner that the engaging surfaces 11 and 12 are in radial planes. To this end, we attach the blank 7 to a work-carrying spindle (not shown), which preferably revolves about a horizontal axis, and in front of the tooth body we mount a hobbing tool 13 to revolve about a horizontal axis designated by reference character 14, disposed at right angles to the axis of rotation 15 of the blank and in a horizontal plane 16 intersecting a longitudinal projection of the annular toothed blank, preferably at its lowest point, as shown clearly in Fig. 3. The hobbing tool, provided on its periphery with cutter blades 10 and 20 having cutting edges 17 and 22 respectively disposed in a common plane of rotation as shown in Fig. 4, is set so that its cutting edges 17 and 22 revolve in a plane parallel to and spaced a predetermined distance from a plane radial to the blank, as will be more fully described hereinafter. The blank and hobbing tool mounted in this relation on a suitable machine such as a hobbing machine, are simultaneously revolved at predetermined speeds, the blank in a clockwise direction viewing Fig. 2, and the hobbing tool in a counter-clockwise direction viewing Fig. 3. By feeding the hobbing tool toward the work in the horizontal plane 16, the cutting blades will be successively brought into contact with the work, and in the course of the hobbing operation, will produce the dental tooth clutch element shown in Figs. 1 and 2.

Attention is directed to the fact that the hobbing tool is positioned at one end of the blank so that the cutting blades operate on the blank while it is traveling transversely to the plane of rotation of the blades as distinguished from the ordinary position of the hobbing tool, in which the tool is disposed radially of the blank so as to work on the periphery thereof. Referring now to Fig. 5, we have shown a diagram of the manner in which the correct position of the cutting blades with relation to the blank is ascertained. This diagram and the calculations are enlarged four times the working dimensions of the case in mind, for purpose of clarity and to reduce the chances of error to a minimum. It will be noted that the sectioned surfaces represent the teeth 9 and the blank space between the teeth represents the portion of the body 8 which is to be cut away. Assuming that the blank is revolved in a clockwise direction viewing Fig. 5 at one-sixth the speed of the hobbing tool and that the latter is set so that its cutting edges 17 and 22 revolve in a plane coincident with a radial plane of the blank, the cutting plane is indicated by the dot-and-dash centerline 18. A cut produced by the tool in this position will not be radial, due to the fact that while the cutting edge travels in a constant vertical plane, radial with respect to the work, the latter is continuously revolving and the resultant line of cutting on the work will be a deviation from the radial plane desired. In order to ascertain to a fine degree of accuracy the extent of such deviation we have proceeded as follows: In the present case, the maximum hob diameter is 4 inches, the circumference of which enlarged four times in accordance with the enlarged scale previously mentioned, gives a circumference of 50.256 inches. Since the hobbing tool revolves six times to each revolution of the work the total travel of a point on the periphery of the hobbing tool during one revolution of the blank is 301.536 inches. A point on the outer circumference of the blank is found to travel 48.70 inches during one revolution of the blank. The relative proportion of the distance traveled by these points, dividing the first by the second mentioned is 6.197. The latter figure divided by the radial depth of the tooth which is 1.875 inches gives .303 inches, the extent of the deviation on the periphery of the blank. This deviation is designated by A—B, Fig. 5, and the resultant surface cut is represented by the line B—C, the curvature of which is from a practical standpoint, negligible.

Having now accurately determined the extent of the deviation, we propose to shift the hobbing tool longitudinally on its axis such predetermined distance that an imaginary line D—E parallel with the line B—C will intersect the axis of rotation of the blank. In other words, the hobbing tool is shifted longitudinally of its axis to a predetermined position in which the plane of rotation 19 of the cutting tool is parallel with but offset from the radial plane 18 of the blank. In this position, it is calculated that the resultant surface cut by the hobbing tooth will be on the line D—E, or in other words in a radial plane. The distance that the plane of rotation of the hobbing cutter must be offset from a plane radial to the blank is determined by projecting the line B—C until it intersects the horizontal diameter 21 of the blank. Then drawing a radial line G—D parallel to the line B—F gives the desired distance C—E, or more accurately, the distance G—H. As a result of the foregoing computations the distance G—H is found to be approximately .949 inches, it being understood that in arriving at this figure the several triangles involved in the diagram have been properly proven by geometrical calculations. Since the diagram is enlarged four times, the actual distance that the cutting edge 17 will be offset from the vertical plane 18 will be one-fourth of .949 inches or .237 inches, which distance is designated by the letter J in Fig. 4.

From the foregoing, it will be seen that we have provided a simple method of hobbing a radial face on a revolving blank to a fine degree of accuracy, and that so far, we have considered simply the cutting of a single surface 11 by means of the blade 10. The next succeeding surface 12 will be cut by the blade 20, the edge 22 of which, as shown in Fig. 4, lies in the same plane of rotation as the cutting edge 17, but the body of the cutter 20 is on the opposite side of said plane, and as shown in Fig. 3, the front face of the cutting edge is spaced 174 degrees in a clockwise direction from the front face of the cutter 10. Thus the surface 12 will be cut 29 degrees from the preceding surface 11 and the cutter 10 in its next operation will engage the work 31 degrees from the preceding surface 12.

It will be manifest that the distance J is variable, depending upon the particular work in hand. That is, this distance varies with the relative relation of the diameters of the hob and the blank, the number of teeth to be cut and the speeds of the hob and blank peripheries. With these factors in mind and following the method outlined above any predetermined radial, curved or deviating face can be cut on a revolving blank by a hobbing operation.

It is believed that the foregoing conveys a full understanding of the objects prefaced above, and while we have illustrated but a single working example of our invention it should be understood that the same might be applied with considerable modification without departing from the spirit and scope of the invention as expressed in the appended claims, in which—

We claim:

1. The method of hobbing radial face teeth on a revolving blank which consists in setting the hobbing blades so that their edges designed to cut radial faces on the blank will revolve in a plane of rotation which is parallel to a radial plane of the blank and spaced a predetermined distance from said radial plane.

2. The method of hobbing a revolving blank to produce a dental tooth clutch which consists in setting the hobbing blades so that their edges designed to cut radial faces on the blank will revolve in a plane of rotation which is parallel to a radial plane of the blank and spaced from said radial plane a distance depending on the relation of the diameters of the hob and blank, the number of teeth, and the relative speeds of the hob and blank peripheries.

3. The method of hobbing a dental tooth clutch which consists in mounting a hobbing tool on an axis transverse to the axis of rotation of the blank and in a horizontal plane parallel with said axis of the blank and intersecting that portion of the blank body to be hobbed, and arranging the cutting blades on the hob so that their edges designed to cut radial faces on the blank will be disposed in a plane of rotation non-radial with respect to said blank but parallel to a radial plane of the blank, the distance between said non-radial plane and said radial plane depending upon the relation of the diameters of the blank, the diameter of the hob, the number of teeth to be cut, and the relative speeds of the hob and blank peripheries.

4. The method of hobbing radial surfaces on a revolving blank which consists in so mounting a hobbing tool having a plurality of blades with cutting edges in a common plane of rotation, that the axis of the hob is at right angles to that of the blank and intermediate the periphery of the latter and the axis thereof, and said plane of rotation is spaced a predetermined distance from a radial plane of the blank in a direction toward the end of the hob approached by the revolving blank.

5. The method of hobbing a dental tooth clutch, consisting in setting the hob at one end of the annular tooth stock with the hob axis at right angles to that of the stock blank, arranging the hob blades so that the front and back face edges are in a common plane of rotation which is parallel with and spaced laterally a predetermined distance from a radial plane of said blank, and feeding the hob toward the blank.

6. The method of hobbing teeth at one end of a revolving blank, which consists in positioning a hob at one end of the blank on an axis at right angles to that of the blank and approximately intersecting a longitudinal projection thereof, and feeding the hob while it revolves, toward the blank.

7. The method of hobbing teeth at one end of a revolving blank, which consists in positioning a hob at one end of the blank on an axis at right angles to that of the blank and approximately intersecting a longitudinal projection thereof, the hob carrying a pair of blades having radial cutting edges disposed in a common plane of rotation and the body of each blade disposed on an opposite side of said plane whereby one blade will cut the front faces of the teeth and the other blade will cut the rear faces thereof, and feeding the hob while it revolves, toward the blank.

8. The herein described method of hobbing teeth on a revolving blank which consists in positioning the hob on an axis transverse to that of the blank and approximately intersecting a longitudinal projection of the annular tooth stock of the blank, positioning the hob blades so that the radially disposed cutting edges for cutting the front and back faces of the teeth are in a common plane of rotation, and so that said plane of rotation is parallel to and spaced laterally a predetermined distance from a radial plane of the blank, and feeding the hob while it revolves, toward the blank.

9. The herein described method of hobbing a dental tooth clutch, which consists in positioning the hob at one end of the blank on an axis transverse to that of the blank and approximately intersecting a longitudinal projection of the blank, positioning blades on the hob, one blade for cutting the front faces of the clutch teeth and another for cutting the rear faces thereof, revolving the blank and the hob about their respective axes, and feeding the hob toward the blank.

10. The method of hobbing teeth at one end of a revolving annular blank consisting in positioning the hob with its axis at right angles to that of the blank and approximately intersecting a longitudinal projection thereof, and so positioning the cutting blades on the hob as to cut teeth at one end of the blank by relative movement between the blank and hob while both are revolved at speeds proportional to the number of teeth to be cut.

11. Hobbing apparatus of the character described comprising a hobbing tool having a plurality of projecting blades having cutting edges in a common plane of rotation, and the bodies of the blades being respectively arranged on alternate sides of said plane.

12. Means for hobbing a revolving blank to produce a dental tooth clutch comprising a hobbing tool having a plurality of cutting blades spaced circumferentially unequal distances apart and having cutting edges disposed in a common plane of rotation, and the bodies of the cutting blades being respectively arranged on alternate sides of said plane.

CARL L. ANDERSON.
CARL E. SWENSON.